United States Patent
Hulick, Jr.

(10) Patent No.: US 9,015,728 B2
(45) Date of Patent: Apr. 21, 2015

(54) METHODS, APPARATUS, AND SYSTEMS TO ACCESS RUNTIME VALUES OF OBJECT INSTANCES

(75) Inventor: Walter T. Hulick, Jr., Pearland, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1165 days.

(21) Appl. No.: 12/902,990

(22) Filed: Oct. 12, 2010

(65) Prior Publication Data
US 2012/0089987 A1 Apr. 12, 2012

(51) Int. Cl.
G06F 9/44 (2006.01)
G06F 9/46 (2006.01)
G06F 13/00 (2006.01)
G06F 9/455 (2006.01)

(52) U.S. Cl.
CPC ............ G06F 9/45508 (2013.01); G06F 9/443 (2013.01); *G06F 9/468* (2013.01)

(58) Field of Classification Search
CPC .............................. G06F 9/45508; G06F 9/443
See application file for complete search history.

(56) References Cited

U.S. PATENT DOCUMENTS

| 6,766,324 B2 | 7/2004 | Carlson et al. | |
|---|---|---|---|
| 7,539,982 B2 | 5/2009 | Stuart | |
| 8,484,370 B1 * | 7/2013 | Coffee et al. | 709/232 |
| 2004/0205669 A1 | 10/2004 | Hoidahl | |
| 2006/0004827 A1 * | 1/2006 | Stuart | 707/102 |
| 2006/0106897 A1 * | 5/2006 | Sapozhnikov et al. | 707/204 |
| 2007/0073769 A1 | 3/2007 | Baikov et al. | |
| 2008/0077756 A1 * | 3/2008 | Shibata | 711/156 |
| 2008/0216102 A1 * | 9/2008 | Quinn | 719/332 |
| 2009/0019104 A1 | 1/2009 | Justen et al. | |

OTHER PUBLICATIONS

Rogers Cadenhead and Laura Lemay; Working with Objects in Java Programming; Jun. 25, 2004; 15 pages.*
Stack Overflow; Retrieving the inherited attribute names/values using Java Reflection, Jun. 25, 2009 and Access to private inherited fields via reflection in Java, Aug. 25, 2010; 9 pages.*

* cited by examiner

*Primary Examiner* — Hyung S. Sough
*Assistant Examiner* — Kimberly Jordan
(74) *Attorney, Agent, or Firm* — Hewlett-Packard Patent Department

(57) ABSTRACT

In one embodiment, a plurality of executable instructions is stored at a first software module. The plurality of executable instructions are collectively configured to provide an identifier of a first object instance to a second software module stored at a memory and executed at the processor. The identifier of the first object instance is received at the second software module in response to execution of the plurality of executable instructions and a textual object element identifier is selected from a plurality of textual object element identifiers. Each textual object element identifier from the plurality of textual object element identifiers uniquely associated with an object element. An identifier of a second object instance is accessed and the object element uniquely associated with the textual object element identifier is reflectively accessed at the second object instance. The first object instance derived from the second object instance.

20 Claims, 6 Drawing Sheets

__(1)__

METHODS, APPARATUS, AND SYSTEMS TO ACCESS RUNTIME VALUES OF OBJECT INSTANCES

BACKGROUND

Reflection is a technique that provides access to elements of objects within an application module by interpreting textual identifiers (or symbolic names) of those elements at runtime rather than using other access methodologies that are interpreted during compilation or linking of that application module. Application modules that utilize reflection can thus access elements and runtime parameters such as data values associated with those elements based on textual identifiers that are evaluated at runtime of such application modules. In other words, the textual identifiers specified to reflectively access object elements are evaluated dynamically during execution of such applications.

The textual identifiers, however, are typically hard-coded within such applications. In other words, one or more textual identifiers that are used at runtime of the application module to access object elements within that application module are defined within the application module when the application module is developed. Thus, the application module can reflectively access only those object elements associated with the textual identifiers included in the application module when the application module is developed.

Furthermore, a user of such an application module is unable to request access to runtime parameters of the application module other than the runtime parameters associated with the textual identifiers included in the application module when the application module is developed. As a consequence, the users of such application modules are often unable to access the runtime parameters that meet the needs of those users.

DETAILED DESCRIPTION

Figure 1:
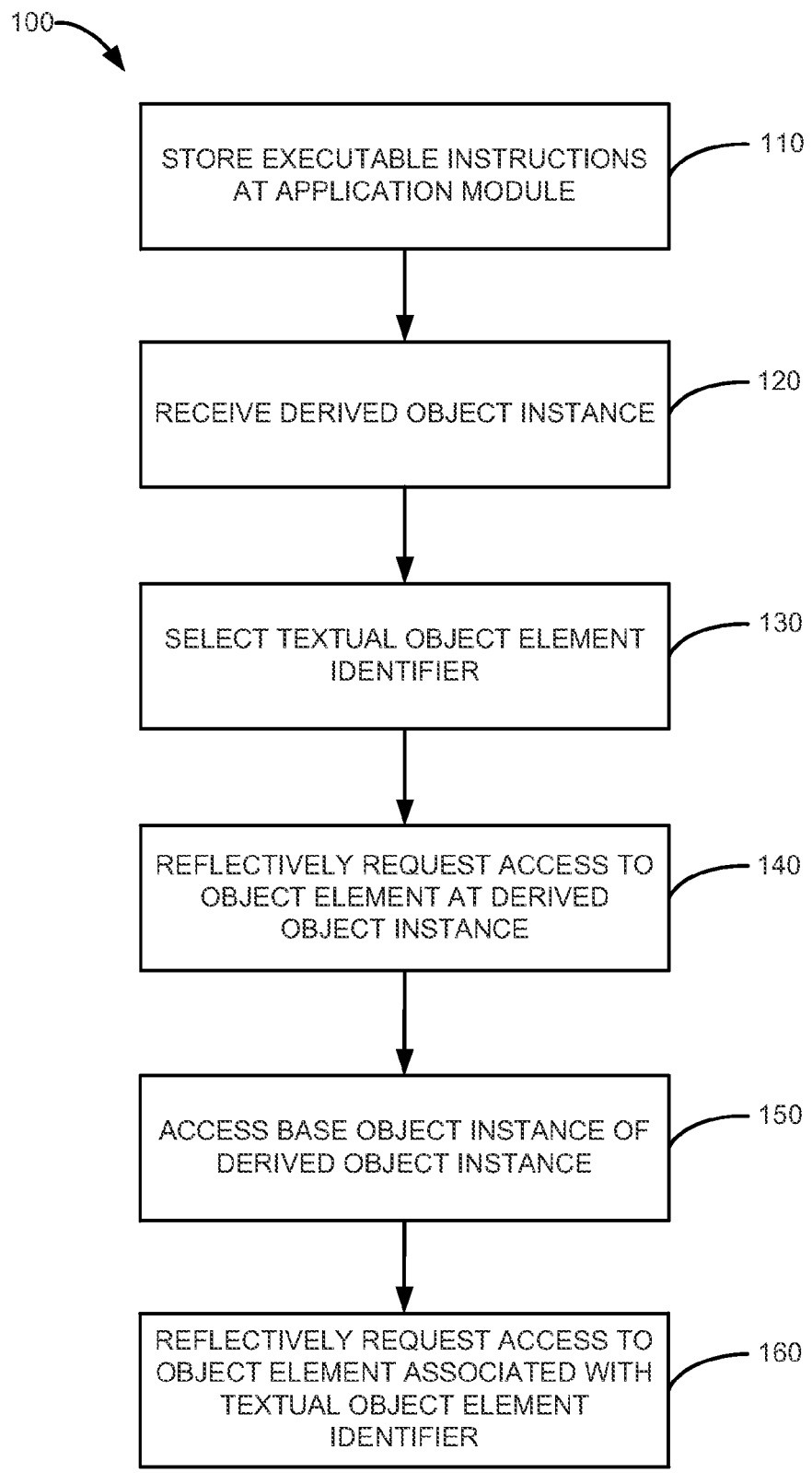
FIG. 1 is a flowchart of a process to reflectively access an object element based on a script expression, according to an embodiment.

Some programming languages such as object-oriented programming languages provide mechanisms by which application modules developed using those languages can access and/or modify their structure and/or functionality. The methodology for realizing such access can be referred to as reflection. More specifically, some programming languages and their associated runtime environments support accessing an element (i.e., a method (or function) or a field (or data field or value)) of an instance of an object developed using those programming languages based on a textual identifier (or a character string such as a symbolic name) of that method or field that is interpreted at runtime.

Application modules are software modules stored at a memory and executed at a processor of a computing device that provide a service such as a data processing service, a data presentation service, and/or a data storage service. For example, an application module can be a word processing application, network service such as a web server, web application, remote data storage, remote data processing, and/or other service available via a network such as the Internet, a client application of a network service such as an electronic mail client or Internet browser application, or some other software module.

An object is an abstract or conceptual structure that includes (or encapsulates) elements (or object elements) such as fields, methods that implement (or reference implementations of) various functionalities, other objects, references to other objects, and/or other data. Object-oriented programming languages typically define an object using a class. A class is a template or blueprint that describes or defines an object. Thus, an application module developed using an object-oriented programming language does not include classes or objects at runtime. Rather such an application module includes instances of objects (or object instances) defined by classes. An object instance is, therefore, an occurrence of a structure within a memory of a computing device that includes the elements of an object.

A textual identifier used for reflection, for example, to reflectively access an object element, can be a symbolic name of that object element. In other words, rather than use constructs or operations of the programming language to directly access a method or a field during compilation or linking, a developer can define a character string including the symbolic name (or name) of an object element to access a reference (or identifier) to that object element and access that object element indirectly using that reference.

Typically, such textual identifiers are hard-coded into application modules. That is, developers specify the textual identifiers in the source code of an application module when the application module is developed. Thus, the textual identifiers are statically included within the application. Reflection can be useful, for example, to determine whether a dynamic instance of an object within an application module includes an element such as a method or field with a particular name statically included in that application module. For example, an application module can include instructions to reflectively request access to an object element with a particular name at an object instance received or generated dynamically during runtime (i.e., during execution of the application). If the object instance includes an object element with the specified name, the application module can receive a reference to that object element and can access that object element (e.g., invoke for a method or get a data value for a field) using the reference. If the object instance does not include an object element with the specified name, an error, exception, or failure notification can be provided to the application module to inform the application module that the object does not include an object element with the specified name.

Reflection has been employed in this and other contexts to provide a developer with flexibility in specifying and/or modifying the operation of an application module. That is, reflection has been used internally within an application module to define the operation of that application module. Embodiments discussed herein can examine runtime values of an application module (e.g., values of elements—such as fields and/or methods—of objects instances within the application module) that are not natively exposed by that application module. In other words, embodiments discussed herein can access runtime values of an application module that are not made accessible by that application module (or the developer of that application module). More specifically, for example, embodiments discussed herein can access runtime values of an application module using reflection based on textual identifiers of those runtime values specified in script expressions (or groups of commands) within a script (i.e., sequences of commands that are interpreted dynamically). Said differently, runtime values of an application module defined by a software developer without instructions to expose (or export) those runtime values can be accessed by a script engine (i.e., a software module that processes or interprets scripts) by reflectively requesting access to those runtime values using textual identifiers associated with those runtime values.

For example, a script reflection engine (i.e., a software module that processes or interprets scripts and reflectively accesses runtime values of an application module) can receive commands from a script and access runtime values (or parameters) of the application module in response to the commands. For example, a script can include a script expression (or expression) with commands to invoke a method of an object that has a symbolic name specified in the script. The script reflection engine can interpret those commands and reflectively invoke that method (or reflectively request access to that method) via a common runtime environment of the script reflection engine and the application module based on the symbolic name (or textual identifier) included in the script. In other words, the script reflection engine can access runtime values of an application module in response to scripts. Thus, a user of the script reflection engine can provide commands to the script reflection engine via scripts to access the runtime values of the application.

Because scripts can be interpreted by the script reflection engine and the script reflection engine accesses the runtime values, the commands in the scripts need not conform to the syntax or constructs of the programming language used to develop the application module including the runtime values. In other words, the script reflection engine can interpret scripts that do not conform to the programming language used to develop the application. Thus, a user of the script reflection engine need not understand or be versed in the programming language used to develop the application module to define commands within the script to access the runtime values of the application.

As used in this specification, the singular forms "a," "an" and "the" include plural referents unless the context clearly dictates otherwise. Thus, for example, the term "expression" is intended to mean one or more expressions or a combination of expressions. Additionally, as used herein, the term "module" refers to circuitry and/or software, firmware, programming, machine- or processor-readable instructions, commands, or code that are stored at a memory and executed or interpreted at a processor.

Furthermore, as used herein, the terms "runtime" and "during execution" are distinct from the operation of a software module such as an application module within or attached to an observation tool such as a debugger in which an external software module (e.g., the debugger or observation tool) controls execution of the application. In other words, the term "runtime" and "during execution" refer to operation of a software module stored at a memory and executed at a processor in communication with that memory in a production environment.

FIG. 1 is a flowchart of a process to reflectively access an object element based on a script expression, according to an embodiment. Process 100 can be implemented as a hardware module and/or a software module. For example, process 100 can be implemented as application-specific circuitry or as a software module including instructions stored at a memory and executed at a processor in communication with the memory. More specifically, for example, process 100 can be implemented at a script reflection engine.

Executable instructions that define or implement an interface to a script reflection engine are stored at an application module at block 110. Application modules are software modules stored at a memory and executed at a processor of a computing device that provide a service such as a data processing service, a data presentation service, and/or a data storage service. For example, an application module can be a web server, an image processing program, an electronic mail server, a database server, or some other software module. A block 110, an application module is instrumented with hooks (or executable instructions) to communicate or interact with the script reflection engine. Thus, the application module can provide data to the script reflection engine when the executable instructions are executed. In some embodiments, such executable instructions can be referred to as instrumentation and the application module including such executable instructions or instrumentation can be referred to as an instrumented application module.

For example, the executable instructions can be codes that cause a processor hosting the application module (i.e., the application module is stored at a memory and executed at a processor in communication with the memory) to provide data related to an object instance to the script reflection engine. Said differently, the executable instructions are interspersed within the codes that implement the application module and, therefore, modify the functionality and/or operation of the application module. Thus, the executable instructions stored (or inserted into) the application module at block 110 are executed at a processor hosting the application module during execution of the application module at that processor. Accordingly, the executable instructions cause the application module to provide data to the script reflection engine.

In some embodiments, the executable instructions can include a value such as a key value or index that is provided to the script reflection engine. In other words, the executable instructions can include an argument value that is provided to the script reflection engine when the executable instructions are executed. For example, an identifier of a script expression can be included within the executable instructions. Thus, an identifier of an object instance and an identifier of a script expression to be executed with respect to that object instance (i.e., textual object element identifiers of the script expression can be used to reflectively request one or more object elements at that object instance and/or object instances associated with that object instance) can be provided from a software module to the script reflection engine in response to execution of the executable instructions.

The script reflection engine can then wait (i.e., suspend execution) or perform various operations until data associated with an object instance of the application module are received at block 120. Said differently, the script reflection engine waits until the executable instructions stored at the application module at block 110 are executed and data, such as an object instance identifier, associated with an object instance of the application module are received from the application module (i.e., in response to execution of the executable instructions) at block 120. In some embodiments, the data received at block 120 that are related to an object instance are a representation of the object instance. For example, a serialized or marshaled copy of the object instance is received at block 120. In some embodiments, an object instance identifier of the object instance is received at block 120. An object instance identifier can be, for example, a reference to an object instance, a symbolic name of an object instance, or some other identifier of an object instance. In some embodiments, the data received at block 120 can include a value such a key value or identifier of a script expression that was included in the executable instructions as discussed above.

Figure 2:
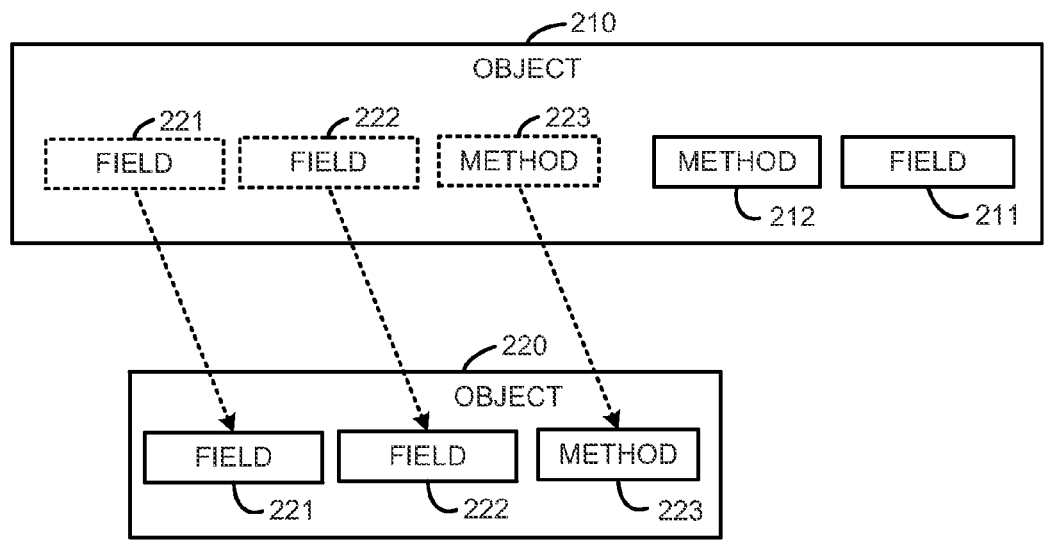
FIG. 2 is an illustration of an object, according to an embodiment.

As an example of an object, FIG. 2 is an illustration of an object, according to an embodiment. Objects are data sets that are organized within a memory of a computing device and can typically be referred to and/or operated on as a single unit. Furthermore, objects can include nested (or embedded or encapsulated) objects. Thus, an object can include elements such as data values, method values that implement (or reference implementations of) various functionalities, other objects, references to other objects, and/or other data. That is, an object can encapsulate such data.

Object 210 illustrates an object. Object 210 includes field 211, method 212, inherited field 221, inherited field 222, and inherited method 223. In other words, field 211 and method 212 are included or exist (i.e., are available) at object 210. Inherited field 221, inherited field 222, and inherited method 223 are included or exist (i.e., are available) at object 220. In other words, object 210 is a derived object of object 220, and object 220 is a base object of derived object 210. Thus, an instance of object 210 can access field 221, field 222, and method 223 at an instance of object 220, but field 221, field 222, and method 223 exist at the instance of object 220.

As a more specific example, object 220 can be an object based on a Java® base class that includes method 223. Object 210 can be based on a Java® derived class that inherits from the class (a base class) of object 220, but does not include a method to override method 223 of object 220. Thus, when method 223 is invoked with respect to (or at) an instance of object 210, method 223 at an instance of object 220 associated with the instance of object 210 is executed. Thus, method 223 can be inherited at instances of object 210 and can exist at instances of object 220.

Referring to FIG. 1, a derived object instance can be received at block 120. In other words, data related to an object instance (the derived object instance) that is based on or inherits attributes, fields, properties, methods, and/or other object elements from a base object (or base class or super class) can be received at block 120.

A textual object element identifier is then selected from a group of textual object element identifiers at block 130. A textual object element identifier is an identifier of an element of an object that is in a textual form. For example, a textual object element identifier can be an alpha-numeric name (such as a symbolic name) of an object element such as a field or method. As a specific example, a textual object element identifier can identify an object instance from multiple object instances that will be used as a starting (or initial or first) object instance for reflectively accessing object elements at object instances based on textual object element identifiers of those object elements. In some embodiments, the group of textual object element identifier can be provided by a user of the script reflection engine (e.g., via an interface such as a graphical user interface or command line interface) or within a configuration file accessed by the script reflection engine.

The textual object element identifier can be selected based on, for example, a key value or argument value included in the executable instructions stored at the application module at block 110 and provided to the script reflection engine within the data received at block 120. That is, the executable instructions can specify one or more textual object element identifiers to be selected by the script reflection engine. As a more specific example, an identifier of a script expression can be included in the executable instructions stored at the application module at block 110 and provided to the script reflection engine within the data received at block 120 and the first textual object element identifier of that script expression can be selected at block 130.

After the textual object element identifier is selected at block 130, the script reflection engine reflectively requests at block 140 access to the object element (i.e., an object element associated with or identified by the textual object element identifier) at the derived object instance received at block 120. In other words, the script reflection engine can communicate with the application module to provide the textual object element identifier to the application module, and the application module can reflectively access at the derived object instance the object element associated with the textual object element identifier.

For example, an environment (such as an operating system) in which the script reflection engine and the application module are executing can provide an interface such as a shared-memory interface and/or a message-passing interface via which the script reflection engine can communicate with the application module. In some embodiments, the derived object instance can be accessible to the script reflection engine via an environment in which the application module and the script reflection engine are executing. For example, the application module and the script reflection engine can each be executing (or hosted) within a common runtime environment, a common execution context, and/or a common virtual machine (or instance of a virtual machine) and the derived object instance can be accessible via that common environment to each of the application module and the script reflection engine. As a more specific example, the script reflection engine and the application module can each include a group of Java® classes that are loaded in a common instance of the Java® Virtual Machine such that instances of objects of the script reflection engine can access instances of objects of the application module. More specifically, the script reflection engine can request access to the object element by invoking a getFieldValue( ) method with the identifier of the derived object instance and the textual object element identifier of the object element as arguments to access a value of a field (i.e., where the object element is a field), and by invoking an executeMethod( ) method with the identifier of the derived object instance and the textual object element identifier of the object element as arguments to invoke a method (i.e., where the object element is a method).

In response to the request of block 140, the script reflection engine can receive an indication that the derived object instance does not include the object element associated with the textual object element identifier selected at block 130. For example, the script reflection engine can receive an error, exception, and/or failure indication (or signal) from the application module and/or from an environment in which the script reflection engine and application module are hosted in response to the request for access to the object element of block 140. In response to the indication that the derived object instance does not include the object element associated with the textual object element identifier selected at block 130, the script reflection engine can access (or request access to) at block 150 an instance of the base object (or base object instance) of the derived object instance. In other words, the script reflection engine can access (e.g., request an object element identifier of) an instance of a base object from which the derived object instance was derived.

At block 160, the script reflection engine can then reflectively request access at the base object instance to the object element associated with the textual object element identifier selected at block 130. In other words, because the object element associated with the textual object element identifier selected at block 130 is not available at the derived object instance, the script reflection engine can attempt to access the object element at the base object instance. If the object element exists at the base object instance, that object element can be accessed. For example, a field data value can be retrieved if the object element is a field of an object and a method can be invoked if the object element is a method of an object. If the object element does not exist at the base object instance, an instance of a base object of the base object instance (i.e., an instance of an object from which the base object instance was derived), if any, can be accessed (e.g., using an object instance identifier of that instance) and block 160 can be repeated for that instance. If the object element does not exist at that instance, process 100 can complete with an error, exception, and/or failure indication (or signal). Thus, the script reflection engine can reflectively access object instances and data values of those object instances of an application module during runtime of that application module based object element identifiers.

Process 100 can include blocks in addition to those illustrated in FIG. 1. Additionally, one or more blocks can be rearranged. Furthermore, although process 100 is discussed above with reference to an example environment including a script reflection engine, process 100 is applicable within other environments. For example, an application module can be instrumented at block 110 by a hardware module and/or software module stored at a memory and executing at a processor in communication with that memory other than a script reflection engine and blocks 120, 130, 140, 150 and 160 can be implemented at the script reflection engine.

Figure 3:
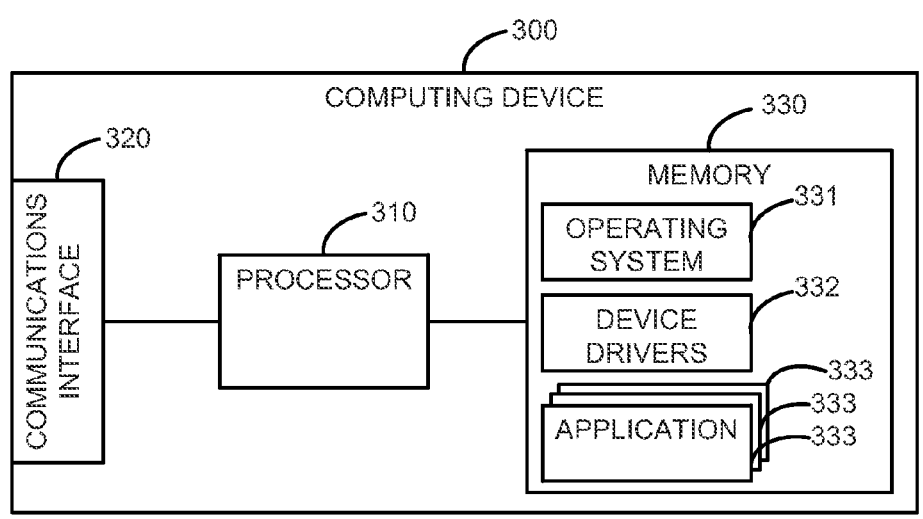
FIG. 3 is a schematic block diagram of a computing device, according to an embodiment.

As discussed above, a script reflection engine and/or an application module can execute at or be hosted at (i.e., be included at a memory and execute at a processor in communication with the memory) a computing device. FIG. 3 is a schematic block diagram of a computing device, according to an embodiment. As illustrated in FIG. 3, computing device 300 includes communications interface 320, processor 310, and memory 330. Processor 310 is operatively coupled to communications interface 320 and memory 330. Typically, as illustrated in FIG. 3, memory 330 includes instructions or codes (e.g., computer codes or object codes) defining software modules that are executed by processor 310 during operation of computing device 310. For example, memory 330 includes instructions that define operating system 331, device drivers 332, and applications 333 (e.g., software application programs). In other words, operating system 331, device drivers 332, applications 333, and other software modules stored as instructions (not shown) at memory 330 and executed at processor 310 are hosted at computing device 300. Applications 333 can include, for example, an application module, a script reflection engine, and/or an environment such as a runtime environment and/or virtual machine instance. Furthermore, data sets (not shown) such as messaging data sets and structured data sets can be stored within memory 330.

Communications interface 320 is an interface accessible to processor 310 to communicate with (i.e., transmit symbols representing data to and receive such symbols from) other processors and/or computing devices via a communications link. In other words, communications interface 320 can receive data from processor 310 and transmit symbols representing that data via a communications link. Moreover, communications interface 320 can receive symbols from other communications interfaces via a communications link and send data represented by those symbols to processor 310. For example, communications interface 320 can be a telephone network interface, a twisted-pair network interface, a coaxial network interface, a fiber-optic network interface, a wireless network interface such as a wireless local area network ("WLAN") or a cellular network, and/or some other network or communications interface.

Figure 4:
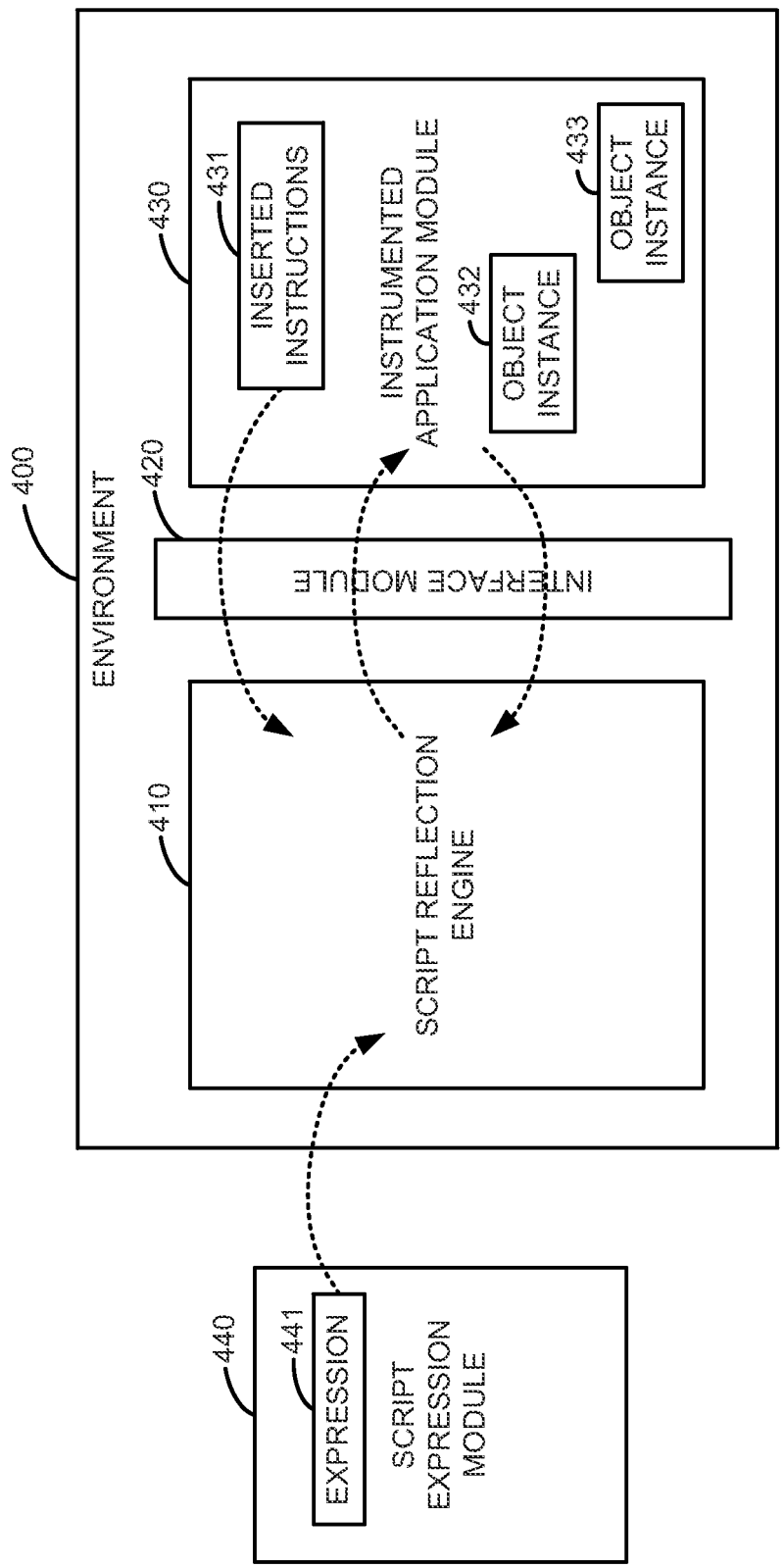
FIG. 4 is an illustration of a scripting tool and an instrumented application module within an environment, according to an embodiment.

As discussed above, memory 330 of computing device 300 can include an environment in at which a script reflection engine and an application module are hosted. FIG. 4 is an illustration of a script reflection engine and an instrumented application module within an environment, according to an embodiment. Environment 400 can be an operating system, a runtime environment, an execution context, and/or a virtual machine (or instance of a virtual machine) and script reflection engine 410 and instrumented application module 430 can be hosted or can execute within environment 400. Additionally, environment 400 includes interface module 420 to facilitate communication between script reflection engine 410 and instrumented application module 430. For example, interface module 420 can be a shared memory interface, a message passing interface, a system call interface, a method calling interface, a field access interface, and/or some other interface that allows script reflection engine and instrumented application module to interact.

Instrumented application module 430 is instrumented with inserted instructions 431. Inserted instructions 431 are executable instructions that have been added to or storage at instrumented application module 430 during an instrumentation process. In other words, an application module can become an instrumented application module when executable instructions are inserted into that application module. In some embodiments, inserted instructions 431 are added to instrument application module 430 after instrumented application module 430 is loaded into environment 400. In some embodiments, inserted instructions 431 are added to instrument application module 430 before instrumented application module 430 is loaded into environment 400. Said differently, a sequence of codes implementing instrumented application module 430 can be altered, modified, or augmented when instrumented application module 430 is stored at a data store such as a database or hard disk, or when instrumented application module 430 is hosted at environment 400.

In addition to inserted instructions 431, instrumented application module 430 includes object instances 432 and 433, which provide functionality such as data processing or manipulation within instrumented application module. For example, object instance 432 can provide a web service via the Hypertext Transfer Protocol ("HTTP") within instrumented application module 430 and object instance 433 can provide access to files at a data store.

Script expression module 440 is a source of reflective script expressions (or expressions) that are accessible to script reflection engine 410. For example, script expression module 440 can be a file including an Extensible Markup Language ("XML") document and script reflection engine 410 can access script expression module 440 via a file access interface (not shown) of environment 400. In some embodiments, script expression module 440 can be a user input interface (e.g., a graphical user interface or a command line interface) via which a user of script reflection engine 410 can specify expressions to script reflection engine 410 and can communicate with script reflection engine via a message-passing, pipe, network, or other interface provided by environment 400.

As illustrated in FIG. 4, script reflection engine 410 can receive expression 441 from script expression module 440. Script reflection engine 410 can receive and parse expression 441 to access a group of textual object element identifiers within expression 441. In other words, expression 441 can include a group of textual object element identifiers and script reflection engine 410 can access each textual object element identifier from the group of textual object element identifiers.

As an example, an expression can have the following form or syntax in which each portion of the expression is separated by a dot character '.':

<Object Instance Identifier>.<Textual Object Element Identifier 1>.<Textual Object Element Identifier 2>.<Textual Object Element Identifier 3>.

Although the expression above includes three textual object element identifiers, other expressions can include more or fewer textual object element identifier.

Script reflection engine 410 can access each textual object element identifier and sequentially request the object element associated with each textual object element identifier in expression 440 reflectively (i.e., the object element associated with each textual object element identifier is requested using that textual object element identifier). Each successive reflective request can be relative to (or at) an object instance received in response to a previous request for an object element. Thus, the object element associated with <Textual Object Element Identifier 1> can be requested at a first object instance associated with <Object Instance Identifier> and that request can return a second object instance identifier. Next, the object element associated with <Textual Object Element Identifier 2> can be requested at the object instance associated with the second object instance identifier and that request can return a third object instance identifier. Finally, the object element associated with <Textual Object Element Identifier 3> can be requested at the object instance associated with the third object instance identifier and that request can return a value associated with a third object instance. That value can be provided, for example, to a user of script reflection engine 410 to expose a runtime value or property of instrumented application module 430 to the user. In other words, a user of script reflection engine 410 can receive runtime values, properties, parameters, and/or other runtime information from instrumented application module 430 even though instrumented application module 430 does not expose or export those runtime values, properties, parameters, and/or other runtime information.

In some embodiments, object element identifiers within expression 441 that are associated with fields of an object element (or field elements) can have a different form or syntax than object element identifiers within expression 441 that are associated with methods of an object element (or method elements). Additionally, script reflection engine 410 can request access to field elements differently than method elements. As a more specific example, expression can have the following form in which each portion of the expression is separated by a dot character '.':

object_instance_identifier.object_method_identifier( ).object_field_identifier.

Script reflection engine 410 can parse expression 441 to access object_instance_identifier, object_method_identifier, and object_field_identifier. Script reflection engine 410 can identify object_instance_identifier as an object instance identifier because it is the first portion of the expression (i.e., the first textual identifier before a '.'). Additionally, script engine 410 can identify object_method_identifier as an identifier of a method element based on the set of parentheses "( )" following the textual identifier, and can identify object_field_identifier as an identifier of a field method based on absence of parentheses "( )" following the textual identifier. As will be discussed in more detail below, when script reflection engine 410 receives an identifier of an object instance associated with object_instance_identifier, script reflection engine 410 can invoke the method element associated with object_method_identifier at that object instance, and can request the value of the field element associated with object_field_identifier at an instance of an object associated with an object instance identifier received in response to the invocation of the method element associated with object_method_identifier.

In some embodiments, a script expression can include arguments or parameters that are provided to a method element when that method element is invoked. For example, an argument can be included between parentheses associated with an identifier of a method element and script reflection engine 410 can provide that argument when that method element is invoked. In the context of the example above, the value '5' can be included as an argument as shown in the expression below:

object_instance_identifier.object_method_identifier(5).object_field_identifier.

As illustrated in FIG. 4, instrumented application module 430 sends data associated with an object instance (e.g., an object instance identifier of that object instance) when inserted instructions 431 are executed at instrumented application module 430. For example, inserted instructions 431 can be inserted within a portion of instrumented application module 430 that includes code that when executed instantiates that object instance. Thus, when that object instance is instantiated (or defined within a memory of a computing system), inserted instructions 431 are executed causing data associated with that object instance to be send to reflection engine 410 and script reflection engine 410 receives the data associated with that object instance. Similarly, each time an instance of that object is instantiated, script reflection engine 410 can receive data associated with that instance because inserted instructions 431 are executed when that instance is instantiated. For example, inserted instruction can be bytecodes to invoke a method of a Java® object instance at script reflection engine 410 when an instance of an object is instantiated at instrumented application module 430.

After the data associated with the object instance is received at script reflection engine 410, script reflection engine 410 can determine whether expression 441 is related to (or associated with) that object instance based on an object instance identifier included in expression 441. For example, if the object instance identifier included in expression 441 matches an object instance identifier (or a name of an object or class associated with that object instance identifier) received from instrumented application module 430 when inserted instructions 431 are executed. Script reflection engine 410 can then reflectively request access to elements of object instances such as object instance 432 and object instance 433 at instrumented application module 430 based on the textual object element identifier included in expression 441, and can receive values from those object instances in response to the reflective requests.

Alternatively, the data associated with the object instance can include a value such as a key value or an identifier of an expression. For example, a key value included in inserted instructions 431 can identify an expression and can be provided to script reflection engine 410 when inserted instructions 431 are executed at instrumented application module 430. Script reflection engine 410 can access object elements identified (e.g., by the textual object element identifiers) in the expression identified by the key value at the object instance associated with an object instance identifier received from instrumented application module 430. In other words, an expression including textual object element identifiers that an expression is related to an object instance identifier based on a key value or other identifier of that expression received from instrumented application module 430.

In some embodiments, textual object element identifiers included in an expression can define textual patterns. For example, textual object element identifiers included in an expression can be based on the syntax of Sequential Query Language ("SQL") "LIKE" statements or of regular expressions and/or another form to describe a pattern using wildcard symbols, sets of symbols, and/or other descriptions of a pattern. Before or concurrently with reflectively requesting access to elements of object instances, script reflection engine 410 can generate textual object element identifiers that satisfy (or match) the textual patterns and can reflectively request access to elements of object instances based on (or using) the generated textual object element identifiers. These textual object element identifiers can be referred to as derived textual object element identifiers because they are derived from a pattern. Thus, a user can specify that a group of elements at one or more object instances be reflectively requested by script reflection engine 410 by including a textual pattern within a textual object element identifier of an expression. This can be useful, for example, if the user does not know the precise textual identifier of the object element of interest to the user. Furthermore, in some embodiments, script reflection engine 410 can reflectively request access to elements of object instances based on (or using) each of the generated textual object element identifiers. In other embodiments, script reflection engine 410 can reflectively request access to elements of object instances based on (or using) each of the generated textual object element identifiers until no error, exception, and/or failure identifier is received. In other words, script reflection engine 410 can reflectively request access to elements of object instances based on (or using) each of the generated textual object element identifiers until a request for access to an element of an object instance using a generated textual object element identifier returns an object instance identifier or other value of an object element.

Figure 5:
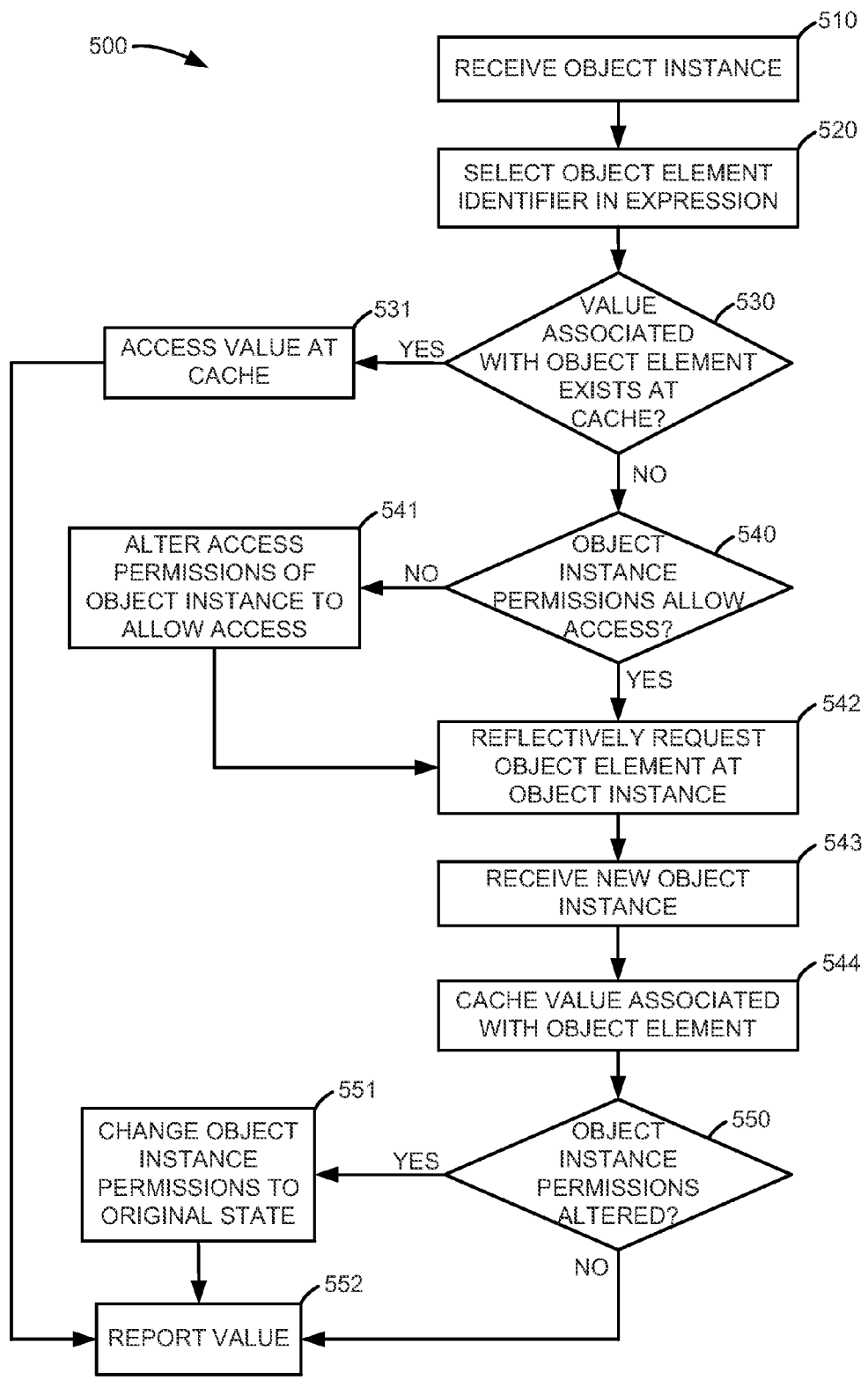
FIG. 5 is a flowchart of a process to reflectively access an object element based on a script expression, according to another embodiment.

FIG. 5 is a flowchart of a process to reflectively access an object element based on a script expression, according to another embodiment. Process 500 can be implemented as a hardware module and/or a software module. For example, process 500 can be implemented as application-specific circuitry or as a software module including instructions stored at a memory and executed at a processor in communication with the memory. More specifically, for example, process 500 can be implemented at a script reflection engine.

Data associated with an object instance is received at block 510, for example, in response to the execution of executable instructions added to the application module during an instrumentation process. As discussed above, the data associated with the object instance can be a representation of the object instance. For example, a serialized or marshaled copy of the object instance can be received at block 510. In some embodiments, an object instance identifier of the object instance is received at block 510. Although the data received at block 510 can differ according to various embodiments, process 500 will be further discussed with reference to an object instance identifier received at 510.

A current textual object element identifier from the script expression received at block 510 is selected or identified at block 520. For example, the first (or next in a subsequent iteration) textual object element identifier from a script expression received from a script expression module (e.g., as discussed above in relation to FIG. 4) can be selected for present use in process 500. In some embodiments, a first object element identifier can be selected from an expression identified by a key value included in the data received at block 510.

After the textual object element identifier is selected at block 520, a cache (e.g., a memory) can be accessed at block 530 to determine whether a value (e.g., a data value or object instance identifier) associated with the object element associated with the textual object element identifier selected at block 520 is available at the cache. For example, a cache can store values associated with expressions indexed by identifiers of those expressions. In other words, a value received in response to reflective access to one or more object element identifiers of an expression at an object instance can be stored in a cache such that a lookup or query of the cache including the identifier of that expression returns the value. Thus, a key value (i.e., an identifier of an expression) received with data related to an object instance identifier from an application module can be used as a key to a cache to determine whether that cache includes a value associated with an object element identified by a textual object element identifier included within an expression identified by that key value.

If the value is available at the cache, the value can be accessed at the cache at block 531 and that value can be reported at block 552. The value can be reported at block 552 by, for example, displaying the value to a user at a display operatively coupled to a computing device, storing the value at a data store, providing the data value to a separate software module, and/or by otherwise outputting the value.

If the cache does not include the value of the object element at block 530, access permissions (or access permissions) of the object instance can be evaluated at block 540 to determine whether the script reflection module can access the object element at the object instance (e.g., can request the object element at the object instance). For example, an object element can include a data field at which permissions values are stored. The permissions values can specify, for example, whether methods of an object instance can be invoked and/or whether fields of an object instance can be accessed. For example, an object instance can include a permissions value that allows read access to the methods and/or fields of that object instance and prohibits write access to the methods and/or fields of that object instance. As a more specific example, Java® defines component access modifiers which control access to a field or method based on a relationship between the field or method and the enclosing class, class package name, and inheritance. Such component access modifiers define what access to (or inspection of) a field or method is permissible (e.g., prohibited or allowed).

If the permissions of the object instance do not allow access to the object element associated with the textual object element identifier selected at block 520 by the script reflection engine, the permissions can be altered or modified at block 541 to allow access by the script reflection engine. For example, an environment in which the script reflection engine and an application module are hosted can provide an interface via which access permissions of object instances can be modified. As an example, an operating system can define an interface for altering access permissions of object instances. As a more specific example, Java® component access modifiers (e.g., component access modifiers for fields, methods, and classes) can be temporarily modified to allow external instrumentation to access and/or modify the component values (e.g., a value of a field).

At block 542, after permissions of the object instance have been altered and if the permissions of the object instance at block 530 do allow access to the object element associated with the textual object element identifier selected at block 520, the object element is reflectively requested at the object instance. For example, if the textual object element identifier is associated with a method element, that method element at the object instance can be invoked. In some embodiments, the script expression accessed at block 520 can include one or more arguments related to that method element and those arguments can be included in the invocation of the method element. Alternatively, if the textual object element identifier is associated with a field element, a method can be invoked to access that field element (e.g., a "getter" method) at the object instance.

Data associated with a new (i.e., different from the object instance at which the object element was requested at block 542) object instance is received at block 543 in response to block 542. Similar to the data associated with the object instance at block 510, the data associated with the object instance can be a representation of the object instance. For example, a serialized or marshaled copy of the object instance can be received at block 543. In some embodiments, an object instance identifier of the object instance is received at block 543. Although the data received at block 543 differ according to various embodiments, process 500 will be further discussed with reference to an object instance identifier received at 543.

A value associated with the object element requested at block 542 is cached at block 544. For example, the object instance identifier received at block 543 or a value of a field or method of the object instance associated with that object instance identifier can be stored at a cache within a memory. For example, the value can be stored within a cache indexed by an identifier such as a hash value or digest of the expression including the textual object element identifier requested at block 542. The cache can be accessed in response to subsequent requests for that object element at that object instance. For example, the cache at which the value is stored at block 544 can be the cache accessed at block 530. Such a cache can be particularly useful in high-performance or time-critical systems to decrease the amount of time to access an object element (or a data value associated with that object element).

If, at block 550, permissions of the object instance received at block 510 were altered at block 541, those permission can be changed to their original state at block 551. In other words, the permissions of the object instance can be returned to the state of those permissions before they were altered at block 541. A value associated with the object element requested at block 542 can then be reported at block 552 (or directly after block 550 if permissions of the object instance were not altered at block 541). For example, the value can be reported as discussed above.

Process 500 can include blocks in addition to those illustrated in FIG. 5. Additionally, one or more blocks can be rearranged. In some embodiments, portions of process 500 such as blocks 520 through 552 can be repeated for each of multiple textual object element identifiers included within a script expression. Furthermore, although process 500 is discussed above with reference to an example environment including a script reflection engine, process 500 is applicable within other environments.

Figure 6:
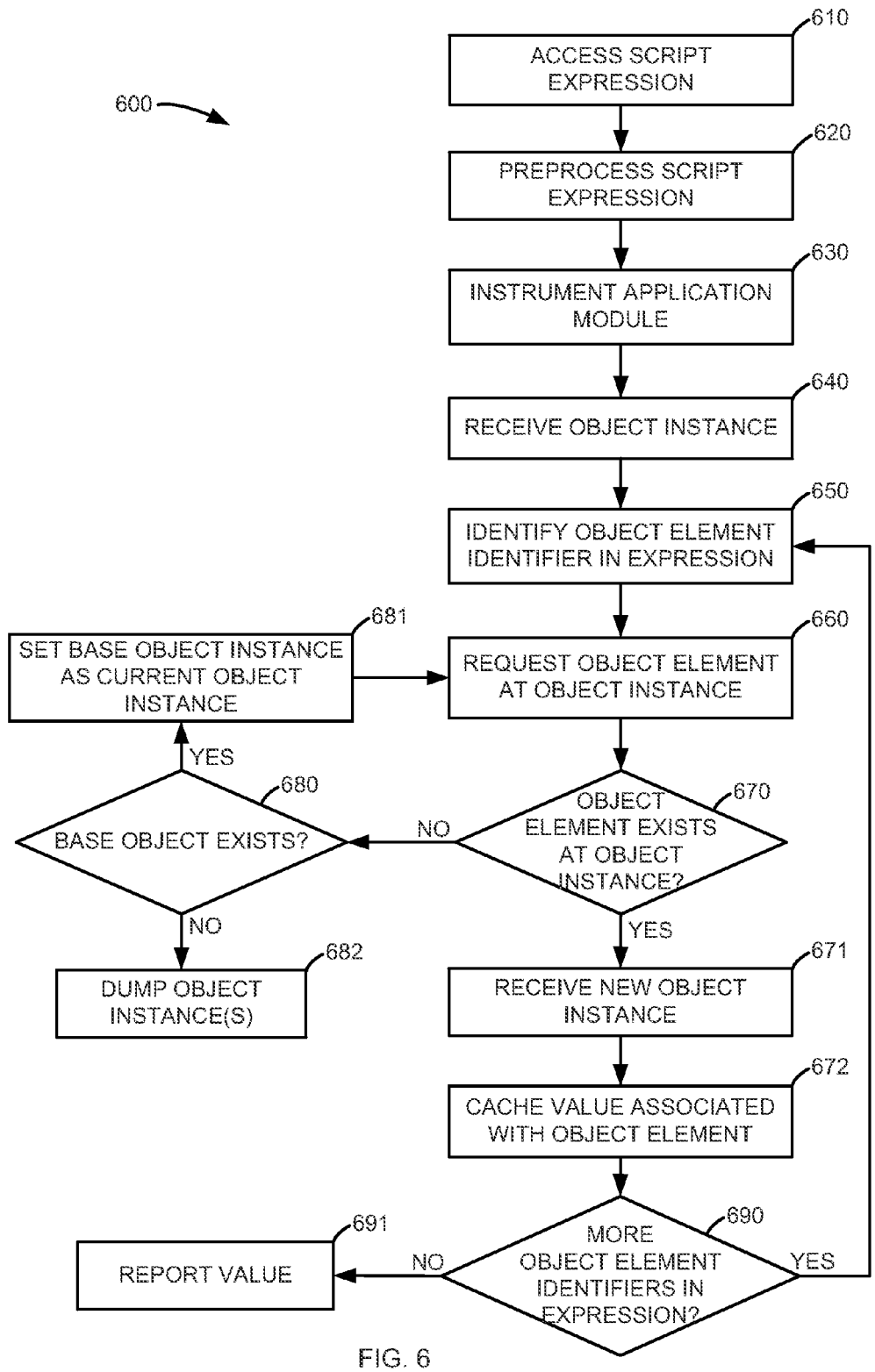
FIG. 6 is a flowchart of a process to reflectively access an object element based on a script expression, according to another embodiment.

FIG. 6 is a flowchart of a process to reflectively access an object element based on a script expression, according to another embodiment. Process 600 can be implemented as a hardware module and/or a software module. For example, process 600 can be implemented as application-specific circuitry or as a software module including instructions stored at a memory and executed at a processor in communication with the memory. More specifically, for example, process 600 can be implemented at a script reflection engine.

A script expression is accessed at block 610. For example, a script expression can be accessed at a script expression module as discussed above in relation to FIG. 4. The script expression is preprocessed at block 620 to prepare the script expression or portions of the script expression for use at a script reflection engine. Preprocessing the script expression can include, for example, parsing the script expression to identify, for example, an object instance identifier, an identifier of a field element, and/or an identifier of a method element within the script expression. As a specific example, a script expression including textual object element identifiers separated by dot '.' characters can be split or separated into multiple substrings using the dot '.' character as delimiter. That is, each text string (or textual object element identifier) separated from another text string by a dot '.' character can be stored separately from the script expression during preprocessing.

In some embodiments, preprocessing of a script expression at block 620 can include generation of a digest or hash value of that script expression. In other words, the script expression (or a portion thereof) can be applied to a hash function to generate a digest of the script expression. The script expression can then be stored at a memory that can be indexed based on the digest. For example, the script expression can be stored within a hash table at a memory to which the digest is the key (or is used to generated the key) to the script expression in the hash table. Thus, the script reflection engine can access the script expression within the hash table based on the digest. Such indexing or hashing can improve performance of the script reflection engine and/or application module by reducing the processing complexity of selecting a script expression or textual object element identifier of a script expression.

An application module is instrumented at block 630 for use with the script reflection engine. For example, executable instructions that define or implement an interface to the script reflection engine are stored at the application module. In other words, the application module can be instrumented with hooks to communicate or interact with the script reflection engine. Thus, the application module can provide data to the script reflection engine when the executable instructions are executed. Executable instructions can be, for example, codes that cause a processor hosting the application module to provide data related to an object instance to the script reflection engine. Said differently, the executable instructions are interspersed within the codes that implement the application module and, therefore, update the functionality of the application module such that the application module provides data to the script reflection engine. An a specific example, Java® bytecodes can be added to or modified within a Java® class file to instrument one or more objects (or object instances) of a Java® application module.

As a specific example of instrumentation, executable instructions can be inserted within a portion of the application module that includes code that when executed instantiates that object instance. Thus, when that object instance is instantiated (or defined within a memory of a computing system), the executable instructions are executed and the script reflection engine receives data associated with that object instance. Similarly, each time an instance of that object is instantiated, the script reflection engine can receive data associated with that instance because the executed instructions are executed when that instance is instantiated.

In some embodiments, executable instruction inserted during instrumentation can include key values that are provided to a script reflection engine when the executable instructions are executed. For example, a digest value of an expression that should be selected at a script reflection engine when that script reflection engine receives data related to an object instance in response to execution of executable instructions inserted into the application module during an instrumentation process can be included with the executable instructions during instrumentation. Said differently, an identifier of a script expression can be included in executable instructions added to an application module during instrumentation of that application module.

Data associated with an object instance is received at block 640, for example, in response to the execution of executable instructions added to the application module during instrumentation. As discussed above, the data associated with the object instance can be a representation of the object instance. For example, a serialized or marshaled copy of the object instance can be received at block 640. In some embodiments, an object instance identifier of the object instance is received at block 640. Although the data received at block 640 can differ according to various embodiments, process 600 will be further discussed with reference to an object instance identifier received at 640.

A current textual object element identifier from the script expression received at block 610 is identified or selected at block 650. For example, the first (or next in a subsequent iteration) textual object element identifier from the script expression can be selected for present use in process 600. At block 660, the object element associated with the textual object element identifier identified at block 650 is reflectively requested at the object instance associated with the object instance identifier received at block 640 using the textual object element identifier identified at block 650. For example, if the textual object element identifier is associated with a method element, that method element at the object instance can be invoked reflectively. In some embodiments, the script expression accessed at block 610 can include one or more arguments related to that method element and those arguments can be included in the invocation of the method element. Alternatively, if the textual object element identifier is associated with a field element, a method can be reflectively invoked to access that field element (e.g., a "getter" method) at the object instance.

If at block 670 the object element exists at the object instance, data associated with a new (i.e., different from the object instance at which the object element was requested at block 660) object instance is received at block 671 in response to block 660. Similar to the data associated with the object instance at block 640, the data associated with the object instance can be a representation of the object instance. For example, a serialized or marshaled copy of the object instance can be received at block 671. In some embodiments, an object instance identifier of the object instance is received at block 671. Although the data received at block 671 can differ according to various embodiments, process 600 will be further discussed with reference to an object instance identifier received at 671.

A value associated with the object element requested at block 660 is cached at block 672. For example, the object instance identifier received at block 671 or a value of a field or method of the object instance associated with that object instance identifier can be stored at a cache within a memory. The cache can be accessed in response to subsequent requests for that object element at that object instance. Such a cache can be particularly useful in high-performance or time-critical systems to decrease the amount of time to access an object element (or a data value associated with that object element).

If additional textual object element identifiers were included in the script expression at block 690, process 600 can return to block 650 and identify (or select) the next textual object element identifier from the script expression to be used in a subsequent a request at block 660 for the object element associated with that textual object element identifier at the object instance associated with the object instance identifier received at block 671. In other words, blocks 660 and 670 can be repeated for a different object instance and different textual object element identifier than the object instance and the textual object element identifier used in the prior iteration of blocks 660 and 670.

If additional textual object element identifiers were not included in the script expression at block 690, process 600 can proceed to block 691 at which a value associated with the object element requested most recently at block 660 is reported. The value (or runtime parameter or data value) can be reported by, for example, displaying the value to a user at a display operatively coupled to a computing device, storing the value at a data store, providing the data value to a separate software module, and/or by otherwise outputting the value.

Returning to block 670, if the object element is not available at the object instance (e.g., the script reflection module receives an error, exception, or failure notification with respect to the request for the object element at the object instance at block 660), the script reflection module can determine whether a base object for the object instance exists at 680. For example, the script reflection module can invoke a method (e.g., provided by an environment in which the script reflection module and the application module are hosted) to determine whether the object instance is based on a class that inherits from another class. For example, in a Java® environment, the getSuperclass( ) method or another reflective call that produces a class on which a class of a current object instance was derived from can be invoked to access the super class of an object instance. If a base object exists for the object instance, the script reflection module can access an instance of the base object (or the base object instance for the object instance) at 681, and the base object instance can become the current object instance at block 660. At block 660, the object element is reflectively requested at (or relative to) the current object instance (i.e., the base object instance).

If the base object does not exist at block 680, the script reflection module implementing process 600 can dump the object instance most recently used at block 660 and/or additional object instances such as, for example, object instances previously used at block 660 (i.e., object instances relative to which an object element was reflectively requested using a textual object element identifier at block 660). The script reflection module can dump the object instances by, for example, accessing a textual object element identifier of each object element of each object instance and a runtime value or parameter of that object element and storing the textual object element identifiers and/or runtime values at a file within a data store. The textual object element identifiers and runtime values can also be dumped as output at a display of a computing device. Furthermore, the textual object element identifiers and runtime values can be dumped by storing the textual object element identifiers and runtime values at a memory of a computing device. Moreover, the textual object element identifiers and runtime values can be dumped to more than one device (e.g., data store, memory, display, etc.).

As a specific example, in Java®, the class hierarchy of each object instance can be traversed and the fields at each class (or object instance) in the hierarchy can be accessed to dump each object instance. Furthermore, all methods with names (or identifiers) that begin with "get" can be invoked at each class (or object instance) in the hierarchy to expose the current runtime values for those methods. These runtime values can then be stored at a data store or a memory or output to a display or other output device. Thus, the runtime values of native and inherited methods and fields of a Java® object instance can be dumped.

In some embodiments, a dump of an object instance can also include a dump (e.g., as described above) of base object instances of that object instance. Additionally, a dump of an object instance can also include a dump of object instances for which that object instance is a base object instance. Additionally, permissions of an object instance can be altered during (or prior to) a dump of that object instance similarly to modification of permissions discussed in relation to FIG. 5.

Process 600 can include blocks in addition to those illustrated in FIG. 6. For example, permissions of object instances can be altered during process 600 as discussed above in relation to FIG. 5. Additionally, one or more blocks can be rearranged. Furthermore, although process 600 is discussed above with reference to an example environment including a script reflection engine, process 600 is applicable within other environments.

Some embodiments include a processor and a related processor-readable medium having instructions or computer code thereon for performing various processor-implemented operations. Such a processor can be a general-purpose processor or an application-specific process and can be implemented as a hardware module and/or a software module. A hardware module can be, for example, a microprocessor, a microcontroller, an application-specific integrated circuit ("ASIC"), a programmable logic device ("PLD") such as a field programmable gate array ("FPGA"), and/or other electronic circuits that perform operations. A software module can be, for example, instructions, commands, and/or codes stored at a memory and executed at another processor. Such a software module can be defined using one or more programming languages such as Java™, C++, C, an assembly language, a hardware description language, and/or another suitable programming language. For example, a processor can be a virtual machine hosted at a computer server including a microprocessor and a memory.

In some embodiments, a processor can include multiple processors. For example, a processor can be a microprocessor including multiple processing engines (e.g., computation, algorithmic or thread cores). As another example, a processor can be a computing device including multiple processors with a shared clock, memory bus, input/output bus, and/or other shared resources. Furthermore, a processor can be a distributed processor. For example, a processor can include multiple computing devices, each including a processor, in communication one with another via a communications link such as a computer network.

Examples of processor-readable media include, but are not limited to: magnetic storage media such as a hard disk, a floppy disk, and/or magnetic tape; optical storage media such as a compact disc ("CD"), a digital video disc ("DVDs"), a compact disc read-only memory ("CD-ROM"), and/or a holographic device; magneto-optical storage media; non-volatile memory such as read-only memory ("ROM"), programmable read-only memory ("PROM"), erasable programmable read-only memory ("EPROM"), electronically erasable read-only memory ("EEPROM"), and/or FLASH memory; and random-access memory ("RAM"). Examples of computer code include, but are not limited to, micro-code or micro-instructions, machine instructions, such as produced by a compiler, and files containing higher-level instructions that are executed by a computer using an interpreter. For example, an embodiment may be implemented using Java™, C++, or other object-oriented programming language and development tools. Additional examples of computer code include, but are not limited to, control signals, encrypted code, and compressed code.

Figure 7:
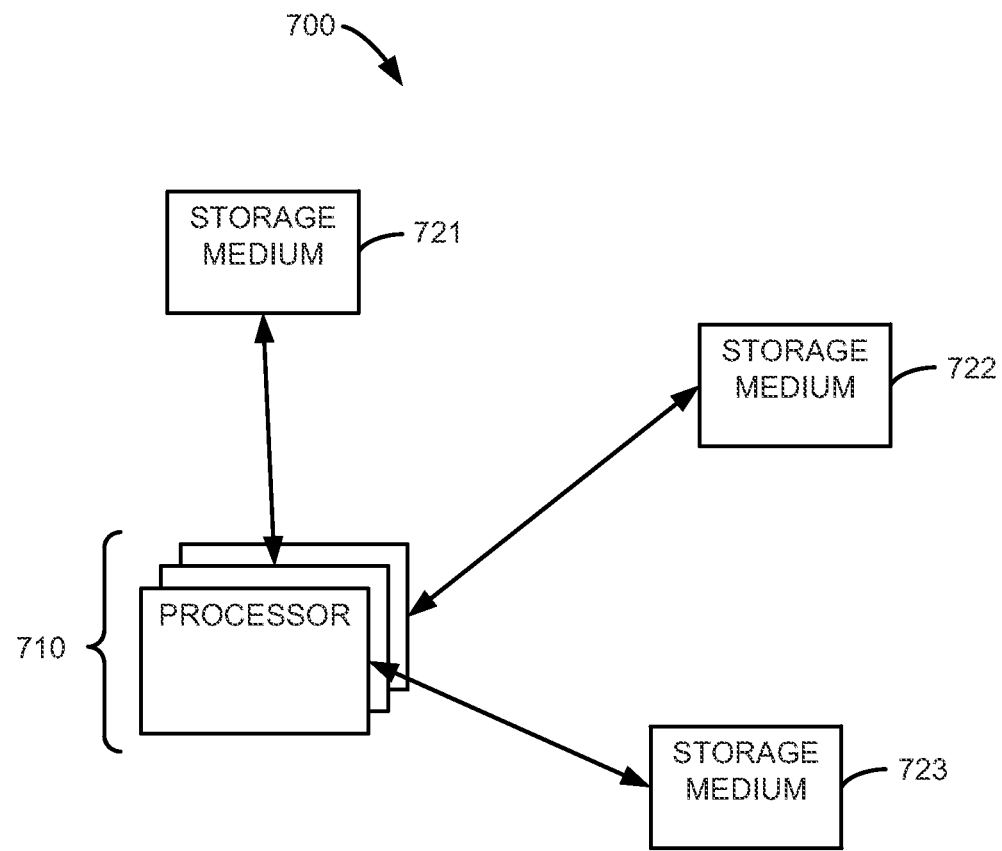
FIG. 7 is a schematic block diagram of a system including a processor and storage media, according to an embodiment.

As an example of a system including one or more processors and processor-readable storage media, FIG. 7 is a schematic block diagram of system 700 including a processor and storage media, according to an embodiment. As illustrated in FIG. 7, system 700 includes one or more processors 710 operatively coupled to storage medium 721, storage medium 722, and storage medium 723. One or more processors 710 can access instructions or code at storage medium 721, storage medium 722, and storage medium 723. Storage media 721, 722, and 723 can be any processor-readable media and/or related devices to access processor-readable media. For example, storage medium 721 can be a hard disk drive including a magnetic storage medium, storage medium 722 can be an optical drive such as a DVD drive and can accept DVD storage media on which processor-readable instructions can be stored, and storage medium 723 can be a FLASH memory drive with a Universal Serial Bus ("USB") interface.

As a more specific example, one or more processors 710 can be included within a computing device having a hard disk drive represented by storage medium 721 and a DVD drive including DVD media represented by storage medium 722. The computing device can also include a USB host controller to communicate with a FLASH memory drive represented by storage medium 723. One or more processors 710 can access processor-readable instructions such as processor-readable instructions that implement an operating system, software application, and/or one or more processes at any of storage media 721, 722, and/or 723. Said differently, one or more processors 710 can interpret or execute instructions at processor-readable media via storage medium 721, storage medium 722, and/or storage medium 723. In some embodiments, system 700 can include one or more memories such as RAM that function as a cache between one or more of storage medium 721, storage medium 722, and/or storage medium 723 and one or more processors 710 for instructions or code stored (or accessible) at one or more of storage medium 721, storage medium 722, and/or storage medium 723.

While certain embodiments have been shown and described above, various changes in form and details may be made. For example, some features of embodiments that have been described in relation to one embodiment and/or process can be useful to other embodiments. In other words, processes, features, and/or properties of various embodiments (e.g., a process performed or a feature existing at) described in relation to one embodiment can be related to other embodiments. Furthermore, it should be understood that the systems and methods described herein can include various combinations and/or sub-combinations of the components and/or features of the different embodiments described. Thus, features described with reference to one or more embodiments can be combined with other embodiments described herein.

What is claimed is:

1. A non-transitory processor-readable medium storing code representing instructions to cause a processor to perform a process, the code comprising code to:
    receive an identifier of a first object instance that inherits from a second object instance in an instrumented application module;
    access an expression including, at a same time, a first textual object element identifier and a second textual object element identifier;
    reflectively request access to a first object element at the first object instance based on the identifier of the first object instance and the first textual object element identifier wherein the first object element is not made accessible by an instrumented application module;
    receive an identifier of the second object instance in response to the reflective request for access to the first object element; and
    reflectively request access to a second object element at the second object instance based on the identifier of the second object instance and the second textual object element identifier wherein the second object element is not made accessible by the instrumented application module.

2. The processor-readable medium of claim 1, the code further comprising code to:
    receive an object element value associated with the second object element in response to the reflective request for access to the second object element at the second object instance; and
    store the object element value at a data cache within a memory.

3. The processor-readable medium of claim 1, wherein the reflective requesting access to the second object element at the second object instance is at a first time, the code further comprising code to:
    receive an object element value associated with the second object element in response to the reflective request for access to the second object element at the second object instance;
    store the object element value at a data cache within a memory;
    receive, at a second time after the first time, an identifier of the second object instance and the second textual object element identifier; and
    access the object element value at the data cache.

4. The processor readable medium of claim 1, wherein the reflective requesting access to the second object element at the second object instance is at a first time, the code further comprising code to:
    modify, before the first time, a permissions value at the second object instance.

5. The processor readable medium of claim 1, wherein the reflective requesting access to the second object element at the second object instance is at a first time, the code further comprising code to:
    access, before the first time, a first permissions value at the second object instance;
    store, before the first time, a second permissions value different from the first permissions value at the second object instance; and
    store, after the first time, the first permissions value at the second object instance.

6. The processor readable medium of claim 1, the code further comprising code to:
    receive an indication that the second object instance does not include the second object element; and
    recursively request access to the second object element based on the second textual object element identifier at each base object instance from a plurality of base object instances associated with the second object instance.

7. The processor readable medium of claim 1, the code further comprising code to:
    receive an indication that the second object instance does not include the second object element;
    recursively request access to the second object element based on the second textual object element identifier at each base object instance from a plurality of base object instances associated with the second object instance;
    determine that no base object instance from the plurality of base object instances includes the second object element; and
    dump each base object instance from the plurality of base object instances in response to the determining.

8. The processor readable medium of claim 1, wherein the second textural object element identifier defines a textual pattern, the code further comprising code to:
    receive an object element value of the second object element in response to the reflective for access to the second object element at the second object instance, the object element having a textual object element identifier that satisfies the textual pattern.

9. The processor readable medium of claim 1, wherein the second textural object element defines a textual pattern, the reflective request for access to the second object element at the second object instance is at a first time, and the reflective request for access to the second object element at the second object instance includes a first derived textual object element identifier based on the textual pattern, the code further comprising code to:
    receive an indication that the second object instance does not include an object element having the first derived textual object element identifier;
    generate a second derived textual object element identifier based on the textual pattern; and
    reflectively request, at a second time after the first time, access to the second object element at the second object instance, the reflective request at the second time for access to the second object element at the second object instance including the second derived textual object element.

10. A method of accessing runtime values of object instances, comprising:
    storing a plurality of executable instructions at a first software module, the plurality of executable instructions collectively configured to provide an identifier of a first object instance to a second software module stored at a memory and executed at a processor;
    receiving the identifier of the first object instance at the second software module in response to execution of the plurality of executable instructions;
    selecting, in response to the receiving, a textual object element identifier from a plurality of textual object element identifiers that are accessed at a same time, each textual object element identifier from the plurality of textual object element identifiers uniquely associated with an object element;
    reflectively accessing an identifier of a second object instance, the first object instance derived from the second object instance; and
    reflectively accessing at the second object instance the object element uniquely associated with the textual object element identifier wherein the object element is not made accessible by the first software module.

11. The method of claim 10, wherein the object element uniquely associated with a first textual object element identifier from the plurality of textual object element identifiers is a field object element and the object element uniquely associated with a second textual object element identifier from the plurality of textual object element identifiers is a method object element, the method further comprising:
receiving, before the selecting, an expression including the plurality of textual object element identifiers.

12. The method of claim 10, wherein:
the executable instructions are Java bytecodes;
the first object instance is a Java object; and
the second object instance is a Java object.

13. The method of claim 10, wherein the reflectively accessing at the second object instance the object element uniquely associated with the textual object element identifier is at a first time, the method further comprising:
receiving an object element value associated with the object element in response to the reflectively accessing at the second object instance the object element uniquely associated with the textual object element identifier;
storing the object element value at a data cache within a memory;
receiving, at a second time after the first time, the identifier of the second object instance and the textual object element identifier; and
accessing the object element value at the data cache.

14. The method of claim 10, wherein the reflectively accessing at the second object instance the object element uniquely associated with the textual object element identifier is at a first time, the method further comprising:
accessing, before the first time, a first permissions value at the second object instance;
storing, before the first time, a second permissions value different from the first permissions value at the second object instance; and
storing, after the first time, the first permissions value at the second object instance.

15. A system to access runtime values of object instances, comprising:
a processor and a computer readable medium storing instructions executable by the processor, the instructions comprising:
a script expression module including a plurality of expressions, each expression from the plurality of expressions having a textual object element identifier, wherein each of the textual object element identifiers is included in the script expression module at a same time;
an instrumented application module including a first object instance and a second object instance, the second object instance being a base object instance of the first object instance wherein each of the textual object element identifiers are not made accessible by the instrumented application module; and
a script reflection engine to receive an expression from the script expression module and an identifier of the first object instance, the instrumented application module configured to provide the identifier of the first object instance to the script reflection engine in response to the instrumentation of the instrumented application module,
the script reflection engine configured to reflectively request access to an object element associated with the textual object element identifier at the first object instance based on the textual object element identifier of the expression and the identifier of the first object instance,
the script reflection engine configured to access the second object instance if the object element is not accessible at the first object instance and reflectively request access to the object element at the second object instance based on the textual object element identifier of the expression.

16. The system of claim 15, wherein the instrumented application module and the script reflection engine are hosted at an instance of a virtual machine.

17. The system of claim 15, wherein:
the instrumented application module is configured to provide a key value to the script reflection engine; and
the script reflection engine is configured to select the expression based on the key value.

18. The system of claim 15, wherein:
the script reflection engine is configured to determine that the object element is not accessible at the second object instance; and
the script reflection engine is configured to dump the first object instance and the second object instance if object element is not accessible at the second object instance.

19. The system of claim 15, wherein:
the script reflection engine is configured to access, before reflectively requesting access to the object element at the first object instance, a first permissions value at the first object instance;
the script reflection engine is configured to store, before reflectively requesting access to the object element at the first object instance, a second permissions value different from the first permissions value at the first object instance; and
the script reflection engine is configured to store, after reflectively requesting access to the object element at the first object instance, the first permissions value at the first object instance.

20. The system of claim 15, wherein the instrumented application module is configured to provide the identifier of the first object instance and a key value to the script reflection engine in response to instantiation of the first object instance, the key value associated with an expression from the plurality of expressions.

* * * * *

UNITED STATES PATENT AND TRADEMARK OFFICE
CERTIFICATE OF CORRECTION

PATENT NO. : 9,015,728 B2  
APPLICATION NO. : 12/902990  
DATED : April 21, 2015  
INVENTOR(S) : Walter T. Hulick et al.

Page 1 of 1

It is certified that error appears in the above-identified patent and that said Letters Patent is hereby corrected as shown below:

Claims

In column 19, line 47, in Claim 4, delete "processor readable" and insert -- processor-readable --, therefor.

In column 19, line 53, in Claim 5, delete "processor readable" and insert -- processor-readable --, therefor.

In column 19, line 64, in Claim 6, delete "processor readable" and insert -- processor-readable --, therefor.

In column 20, line 5, in Claim 7, delete "processor readable" and insert -- processor-readable --, therefor.

In column 20, line 19, in Claim 8, delete "processor readable" and insert -- processor-readable --, therefor.

In column 20, line 22, in Claim 8, delete "for" and insert -- request for --, therefor.

In column 20, line 26, in Claim 9, delete "processor readable" and insert -- processor-readable --, therefor.

Signed and Sealed this  
Ninth Day of February, 2016

Michelle K. Lee  
*Director of the United States Patent and Trademark Office*